Aug. 29, 1961 L. E. RUSSELL 2,998,022
INFLATOR VALVE BODY
Filed Feb. 5, 1954

INVENTOR.
LINUS E. RUSSELL
BY
Tom Walker

United States Patent Office 2,998,022
Patented Aug. 29, 1961

2,998,022
INFLATOR VALVE BODY
Linus E. Russell, Springfield, Ohio, assignor to Peters & Russell, Inc., Springfield, Ohio, a corporation of Ohio
Filed Feb. 5, 1954, Ser. No. 408,419
7 Claims. (Cl. 137—223)

This invention relates to inflator valve body, and more particularly to a valve housing forming a part of inflator valve means for collapsible boats and other inflatable articles of manufacture.

The valve housing of the present invention is particularly applicable to articles having spaced wall panels, and provides a means for maintaining the spaced walls in predetermined position irrespective of internal pressure therebetween.

The object of the invention is to simplify the construction as well as the means and mode of installation and operation of valve housings, whereby such housings may not only be economically manufactured, but will be more efficient in use, of relatively long life, easily adaptable to different installations, while being unlikely to get out of repair or become unsatisfactory in use.

A further object of the invention is to obviate failure of the wall structure in the area of the valve due to inflationary pressures.

Another object of the invention is to provide a valve structure in which the internal air pressures are not applied in a manner tending to separate the valve structure from the spaced walls of the panel.

A further object of the invention is to present a valve structure which can be quickly and easily installed and which is secure against damage from inflationary pressures.

A further object of the invention is to provide a valve housing possessing the advantageous structural features, the inherent meritorious characteristics and the mode of use herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Figure 1:
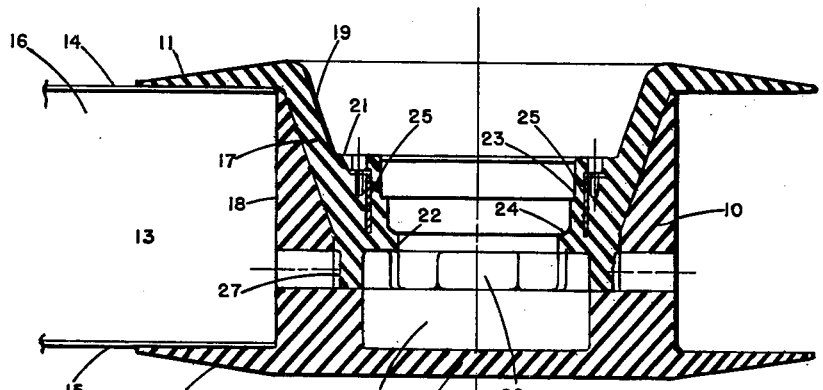
Figure 2:
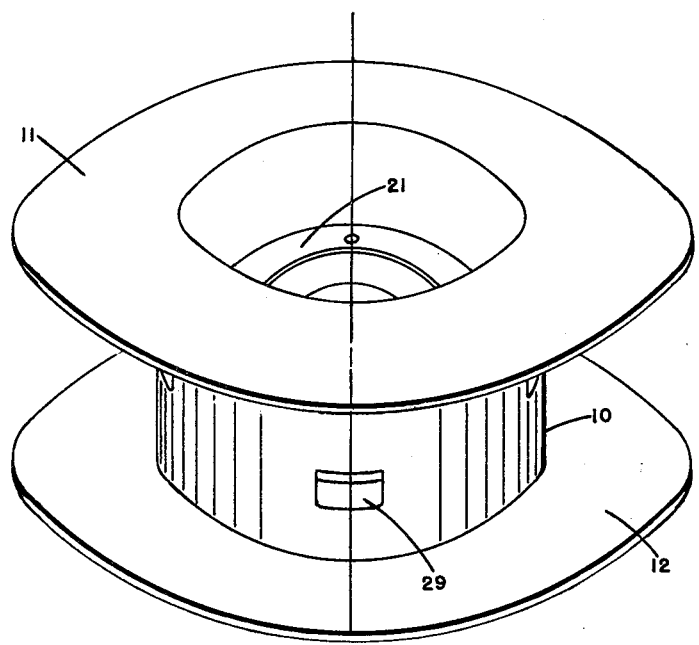

Referring to the accompanying drawing, wherein is found one, but obviously not necessarily the only form of embodiment of the invention, FIG. 1 is a view in longitudinal section of a valve structure in accordance with the illustrated embodiment of the invention, a fragment of a spaced wall panel mounting the valve structure also being shown; and FIG. 2 is a view in perspective of the device of FIG. 1.

Like parts are indicated by similar characters of reference throughout the several views.

Referring to the drawing, a valve structure in accordance with the illustrated embodiment of the invention has a generally spool-like shape. Thus, it comprises a cylindrical body 10, from the opposite ends of which project radial tapered flanges 11 and 12 defining an annular space 13 in surrounding relation to the body. The body 10 and flanges 11 and 12 are constructed out of a rubber or rubber-like material. The flanges 11 and 12 are adapted and arranged to overlap respective walls 14 and 15 of a spaced wall panel 16, and are secured to such walls by an appropriate bonding or vulcanizing process. It will be understood that the panel 16 has a suitable opening to receive the instant valve structure, which is installed therein to provide a means for controlling fluid flow to and from the space between the walls 14 and 15. The annular space 13 registers with and in effect becomes a part of the space between the panel walls in the installed position of the valve structure.

Further in the illustrated instance, the valve structure is of two-part construction, being made up of complementary, interfitting parts 17 and 18 joined together in a bonding or vulcanizing process to form a unitary device. The part 17 includes the flange 11 and is further formed with a depressed portion having a recess or well 19. The latter terminates in a wall 21 in which is formed a bore 22 and a counterbore 23, such bore and counterbore defining a ledge 24. The wall 21 with its bore and counterbore 22—23 provides a support for a valve means (not shown), which includes a part engageable therewith to locate the valve means in proper position. Metallic reinforcement members 25 are molded into the wall 21 and provide reactant means for screw fasteners by which the valve means may be detachably mounted in the body 10.

The part 18 includes the flange 12 and has a cylindrical portion complementary to and receiving the depressed portion of part 17, such complementary portions being bonded together as described. A recess 26 in the part 18 directly receives a cylindrical inner end 27 of the wall 21, and constitutes a chamber closed at its bottom by a wall 28 in the same plane as the flange 12. A series of radial openings 29 in the part 18 communicates the chamber 26 with the aforementioned annular space 13.

It will be understood that the disclosed valve structure, in conjunction with suitable valve means, is useful as an inflator valve, and may be readily installed in a known type of double-ply panel in which the walls are made of a flexible composition material and assume a substantial degree of rigidity in the presence of air pressure in the space between the walls. Such panels have their edges appropriately sealed and are made in the form of many objects, for example boats. The body 10 may be made either in two pieces, as shown, or in one piece. The two-piece form may be preferable since it is less costly to construct and is somewhat easier to install. Thus, the two parts 17 and 18 may be inserted in the panel from opposite sides thereof, placed in cooperative engagement with one another, and then bonded together as a part of the same operation by which the flanges 11 and 12 are bonded to respective walls 14 and 15.

Still further, it will be observed that the body 10 of the valve structure directly interconnects the walls 14 and 15. The inflationary pressures in the space 13, and the space between the walls 14 and 15, being confined to the chamber 26, are not applied in a manner to separate the flanges 11 and 12 from the walls 14 and 15.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:
1. A flexible inflator valve body for installation in a panel having spaced apart walls, including a cylindrical body portion having radial flanges at its opposite ends, a recess in said body opening through one end thereof, the opposite end of said body being closed and defining the bottom of said recess, a transverse wall integrally formed with said body portion intermediate the ends thereof and having longitudinal through bore means therein defining a valve mounting, said transverse wall defining with the bottom of said recess a chamber in said body, and at least one radial port in said body opening said chamber to the exterior of said body for communication with the space between the walls of said spaced wall panel.

2. A flexible inflator valve body for installation in a panel having spaced apart walls, including a cylindrical body portion having radial flanges at its opposite ends whereby to define a spool-like housing having an annular space in the periphery thereof, of recess in said body opening through one end thereof, the opposite end of said body being closed and defining the bottom of the recess, a transverse wall intermediate the ends of said body portion and formed integrally therewith, said wall having longitudinal through bore means defining a valve mounting, said transverse wall defining with the bottom of said recess a chamber, and at least one radial port in said body communicating said chamber with said annular space.

3. A valve structure according to claim 2, characterized in that said body is unitarily constructed out of a resilient material, said flanges being an integral part thereof and adapted and arranged to be bonded to the walls of said panel for installation of the valve structure in said panel.

4. An inflator valve body for installation in a double-ply panel having flexible spaced apart walls, including a first body element having a cylindrical portion formed at its one end with an outwardly projecting radial flange, the interior of said cylindrical portion being hollow and open through the opposite end thereof, an internal annular ledge on said cylindrical portion intermediate the ends thereof, a radial opening through said cylindrical portion located between said internal ledge and the said opposite end of said cylindrical portion, and a second body element having a cylindrical portion received in the said open opposite end of said first body element and formed at its one end with a radially projecting flange in complementary relation to the flange on said first body element, the opposite end of the cylindrical portion in said second body element extending substantially into abutment with said internal ledge on said first body element and being radially cut away to communicate the interior of said second body element with the exterior of the valve body between said flanges by way of said radial opening, and an internal annular ledge on the interior of the cylindrical portion of said second body element intermediate the ends thereof to mount a valve thereon said cylindrical portion of said second body element being open through its said one end and said body elements being joined together to define a unitary body.

5. An inflator valve body according to claim 4, characterized by screw reactant means stationarily installed in the said internal annular ledge in the cylindrical portion of said second body element.

6. An inflator valve body for installation in a double-ply panel having flexible spaced apart walls, including a body portion formed at its opposite ends with outwardly projecting radial flanges, the interior of said body portion being hollow and opening through one end thereof, the opposite end being closed, and a transverse wall in said body portion intermediate the ends thereof defining with the open end of said body portion a recessed well and with the closed end thereof a fluid chamber, said body portion having radial opening means communicating said fluid chamber with the exterior of said body portion between said radial flanges, and said wall having a longitudinal through bore and radial ledge means to provide a valve mount.

7. A flexible inflator valve body for installation in a panel having spaced apart walls, including a cylindrical body portion comprising a two part body construction, the respective parts thereof interfitting with one another and being bonded into a unitary construction and having radial flanges at its opposite ends thereby to define a spool-like housing having an annular space in the periphery thereof, a recess in said body opening through one end thereof, the opposite end of said body being closed and defining the bottom of the recess, a transverse wall intermediate the ends of said body portion and formed integrally therewith, said wall having longitudinal through bore means defining a valve mounting, said transverse wall defining with the bottom of said recess a chamber, and at least one radial port in said body communicating said chamber with said annular space.

References Cited in the file of this patent
UNITED STATES PATENTS

| | | |
|---|---|---|
| 1,930,040 | Crowley | Oct. 10, 1933 |
| 1,942,959 | Fenton | Jan. 9, 1934 |
| 2,189,485 | Crowley | Feb. 6, 1940 |
| 2,490,472 | Raske | Dec. 6, 1949 |
| 2,639,750 | Phane | May 26, 1953 |
| 2,645,791 | Klabunde | July 21, 1953 |
| 2,679,857 | Russell | June 1, 1954 |
| 2,789,577 | Hosking | Apr. 23, 1957 |